US008028126B2

(12) United States Patent
Bougaev et al.

(10) Patent No.: US 8,028,126 B2
(45) Date of Patent: Sep. 27, 2011

(54) SCHEDULING SPIN-UP OPERATIONS FOR A SET OF HARD DISK DRIVES

(75) Inventors: Anton A. Bougaev, La Jolla, CA (US); Aleksey M. Urmanov, San Diego, CA (US); Kenny C. Gross, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 664 days.

(21) Appl. No.: 12/135,450

(22) Filed: Jun. 9, 2008

(65) Prior Publication Data
US 2009/0303632 A1 Dec. 10, 2009

(51) Int. Cl.
*G06F 12/00* (2006.01)
(52) U.S. Cl. ............................. 711/112; 711/E12.001
(58) Field of Classification Search .................. 711/112, 711/114, 111, E12.001, 167; 713/320, 330, 713/340
See application file for complete search history.

(56) References Cited

U.S. PATENT DOCUMENTS

| 5,821,715 | A  | * | 10/1998 | Plutowski et al. | ............ | 318/472 |
| 6,286,108 | B1 | * | 9/2001  | Kamo et al.      | .................. | 713/330 |
| 2003/0212857 | A1 | * | 11/2003 | Pacheco et al. | ............... | 711/114 |
| 2009/0265519 | A1 | * | 10/2009 | Moore et al.   | .................. | 711/162 |

FOREIGN PATENT DOCUMENTS

EP    1 564 737 A2 *  8/2005

* cited by examiner

*Primary Examiner* — Pierre-Michel Bataille
(74) *Attorney, Agent, or Firm* — Park, Vaughan, Fleming & Dowler LLP

(57) ABSTRACT

Some embodiments of the present invention provide a system for scheduling spin-up operations for a set of hard disk drives (HDDs) in a computer system. During operation, the system determines an available power of the computer system. Next, one or more HDDs are selected from the set of HDDs to be spun-up based on the available power and the power required to spin up each HDD. Then, spin-up operations are scheduled for the selected HDDs.

20 Claims, 2 Drawing Sheets

SCHEDULING SPIN-UP OPERATIONS FOR A SET OF HARD DISK DRIVES

BACKGROUND

1. Field

The present invention generally relates to techniques for improving the performance of computer systems. More specifically, the present invention relates to a method and an apparatus for scheduling spin-up operations for a set of hard disk drives in a computer system.

2. Related Art

Some computer system manufacturers are beginning to offer high-storage capacity computer systems with hundreds or thousands of hard disk drives (HDDs). The power supply units (PSUs) in multi-HDD systems are typically provisioned to provide enough power to spin-up and operate all the HDDs in the system. However, since a typical HDD may draw more than twice as much current during spin-up as it draws during normal operation, manufacturers often provision PSU power capacities of more than 2 times of that needed for normal operating conditions so that most or all of the HDD can be spun-up at once.

This over-provisioning can be inefficient from cost and technology points of view, and results in wasted energy. Spin-ups are typically fairly rare events for highly utilized systems, so most of the operating life of over-specified power supplies may be spent operating at one-half or less of their maximum capacity. This can result in wasted energy since power supplies operate less efficiently when used far from their maximum capacity. Also, higher-power PSUs are typically more expensive, require more space, and add more weight to computer systems.

Hence, what is needed is a method and an apparatus for scheduling spin-up operations for a set of hard disk drives in a computer system in a manner that limits the aggregate system power required to perform the spin-up operations.

SUMMARY

Some embodiments of the present invention provide a system that schedules spin-up operations for a set of hard disk drives (HDDs) in a computer system. During operation, an available power of the computer system is determined. Next, one or more HDDs from the set of HDDs is selected to be spun-up based on the available power and the power required to spin-up each HDD. Then, spin-up operations are scheduled for the selected HDDs.

In some embodiments, determining the available power includes determining a power consumption of the computer system, and subtracting the determined power consumption from a maximum power for the computer system.

In some embodiments, determining a power consumption for the computer system includes estimating the power consumption by inferring the power consumption from instrumentation signals.

In some embodiments, inferring the power consumption from instrumentation signals includes inferring the power consumption from an inferential power model generated during a training phase.

In some embodiments, the method further comprises determining the maximum power for the computer system based on at least one of: a power-supply constraint for the computer system, and a thermal constraint of the computer system.

In some embodiments, determining the available power includes generating a dynamic trace of power consumption for the computer system based on dynamic traces of currents and associated voltages for individual components within the computer system.

In some embodiments, scheduling spin-up operations for the selected HDDs includes spinning-up the HDDs.

In some embodiments, determining the available power includes periodically determining the available power of the computer system, selecting the one or more HDDs to be spun-up includes periodically selecting the one or more HDDs to be spun up, and scheduling spin-up operations for the selected HDDs includes periodically scheduling spin-up operations for the selected HDDs.

In some embodiments, periodically scheduling spin-up operations for the selected hard drives includes periodically scheduling spin-up operations until all HDDs in the set of HDDs have been scheduled to be spun-up.

In some embodiments, periodically determining the available power includes determining the available power at least once every 5 seconds.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Figure 1:
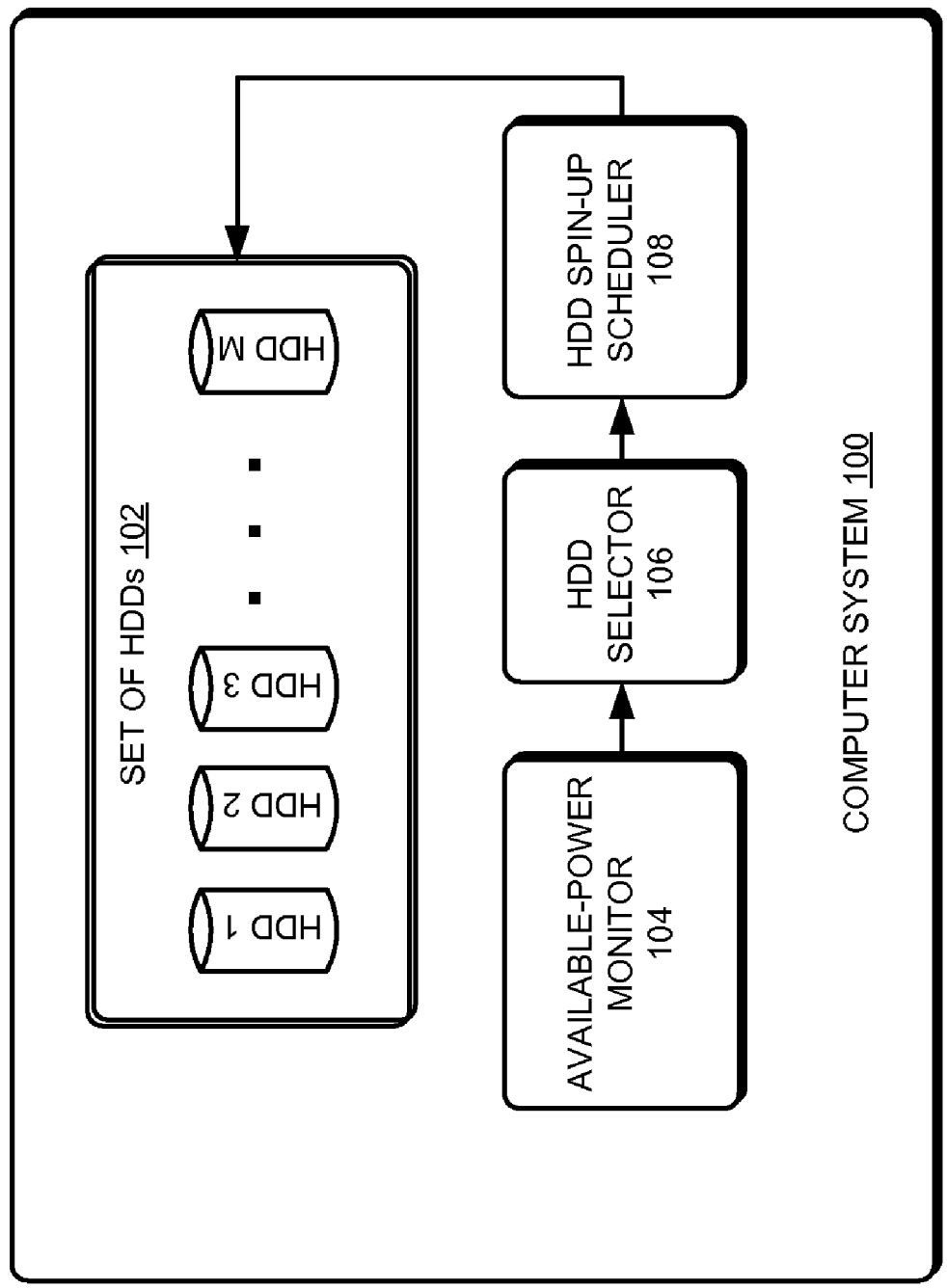
FIG. 1 illustrates a system for scheduling spin-up operations for a set of hard disk drives in a computer system.

FIG. 1A illustrates a system for scheduling spin-up operations for a set of hard disk drives in a computer system. Computer system 100 includes set of hard disk drives (HDDs) 102, available-power monitor 104, HDD selector 106, and HDD spin-up scheduler 108. Set of hard disk drives 102 includes M HDDs, with HDD 1, HDD2, HDD3, and HDD M depicted.

Computer system 100 can include but is not limited to a server, server blade, a datacenter server, an enterprise computer, a field-replaceable unit that includes a processor, or any other computation system that includes one or more processors and one or more cores in each processor.

Available-power monitor 104 can be any device that can determine the available power of computer system 100. Available-power monitor 104 can be implemented in any combination of hardware and software. In some embodiments, available-power monitor 104 operates on a computer system other than computer system 100. In other embodiments, available-power monitor 104 operates on one or more service processors. In some embodiments, available-power monitor 104 includes a method or apparatus for generating a dynamic trace of power consumption for a computer system as described in U.S. Pat. No. 7,197,411, entitled "Real-Time Power Harness," by Kenny C. Gross, Kalyanaraman Vaidyanathan, Aleksey M. Urmanov, Keith A. Whisnant, and Steven F. Zwinger, issued on 27 Mar. 2007, which is hereby fully incorporated by reference. In some embodiments, available-power monitor 104 includes a method or apparatus for estimating power consumption in a computer system by inferring the power consumption from instrumentation signals as described in a U.S. patent application entitled "Inferential Power Monitor Without Voltage/Current Transducers," by Kenny C. Gross, Kalyanaraman Vaidyanathan, and Ramakrishna C. Dhanekula, application Ser. No. 11/205,924, filed 17 Aug. 2005, which is hereby fully incorporated by reference. In some embodiments, available-power monitor 104 includes a method or apparatus for estimating a power utilization of a computer system as described in a U.S. patent application entitled "Estimating a Power Utilization of a Computer System," Andrew J. Lewis, Kalyanaraman Vaidyanathan, and Kenny C. Gross, application Ser. No. 12/109,112, filed 24 Apr. 2008, which is hereby fully incorporated by reference.

HDD selector 106 can be any device that can receive input from available-power monitor 104 and select HDDs from set of HDDs 102 based on the available power and the power required to spin-up each HDD. HDD selector 106 can be implemented in any combination of hardware and software. In some embodiments, HDD selector 106 operates on one or more service processors. In other embodiments, available-power monitor 104 operates on a separate computer system.

HDD spin-up scheduler 108 can be any device that can receive input from HDD selector 106 and schedule the spin-up of the HDDs selected by HDD selector 106 from set of HDDs 102. HDD spin-up scheduler 108 can be implemented in any combination of hardware and software. In some embodiments, HDD spin-up scheduler 108 operates on one or more service processors. In other embodiments, HDD spin-up scheduler 108 operates on a separate computer system.

Some embodiments of the present invention operate as follows. Available-power monitor 104 determines the available power of computer system 100 by first determining a maximum power for computer system 100. In some embodiments, the maximum power for computer system 100 is determined based on parameters including but not limited to a predetermined maximum power of the power supply for computer system 100; or any other thermal, mechanical, or electrical constraints that may have an impact on the maximum power output by the power supply used by computer system 100. In other embodiments, available-power monitor 104 uses a predetermined maximum power level that is less than the maximum power available from the power supply used by computer system 100. In still other embodiments, the maximum power for computer system 100 is determined based on the maximum power transmitted to the installation housing computer system 100, or a predetermined maximum power allowed to be drawn by computer system 100 from the installation housing computer system 100.

Available-power monitor 104 also determines the amount of power currently being used by computer system 100. In some embodiments, available-power monitor 104 determines the amount of power currently being used by computer system 100 using methods including but not limited to those disclosed in U.S. Pat. No. 7,197,411; U.S. patent application entitled "Inferential Power Monitor Without Voltage/Current Transducers," application Ser. No. 11/205,924, filed 17 Aug. 2005; U.S. patent application entitled "Estimating a Power Utilization of a Computer System," application Ser. No. 12/109,112, filed 24 Apr. 2008; directly measuring the current power usage; receiving a signal related to the current power usage; or any other method now known or later developed that can determine the current power usage of a computer system. Available-power monitor 104 then determines the available power of computer system 100 by subtracting the current power usage from the maximum available power for computer system 100.

The amount of available power is then sent to HDD selector 106. In some embodiments, HDD selector 106 selects a subset of HDDs that have not yet been spun-up from set of HDDs 102 such that the maximum power required to spin-up the HDDs in the selected subset of HDDs does not exceed the available power determined by available-power monitor 104. In some embodiments, the HDDs are prioritized based on a predetermined prioritization of spin-up order of HDDs in set of HDDs 102, and the subset is selected based on the predetermined prioritization. In other embodiments, HDD selector 106 selects the subset of HDDs by randomly selecting HDDs that have not yet been spun-up from set of HDDs 102. In still other embodiments, HDD selector 106 selects the subset of HDDs by selecting HDDs that have not yet been spun-up from set of HDDs 102 in a predetermined order. The subset is then sent to HDD spin-up scheduler 108.

HDD spin-up scheduler 108 then schedules the spin-up of the subset of HDDs and starts them spinning-up. In some embodiments, the process of determining the available power of computer system 100, selecting a subset of HDDs, scheduling the subset for spin-up and starting the spin-up of the subset of HDDs occurs periodically until all HDDs in set of HDDs 102 have been spun-up. In some embodiments, the process repeats every 5 seconds, 10 seconds, and 1 minute.

In some embodiments, the maximum power for computer system 100 is determined during a design phase for computer system 100, taking into account the use of embodiments of the present invention to schedule spin-up operations for HDDs in computer system 100. This maximum power is then used to specify a power supply for computer system 100.

Figure 2:
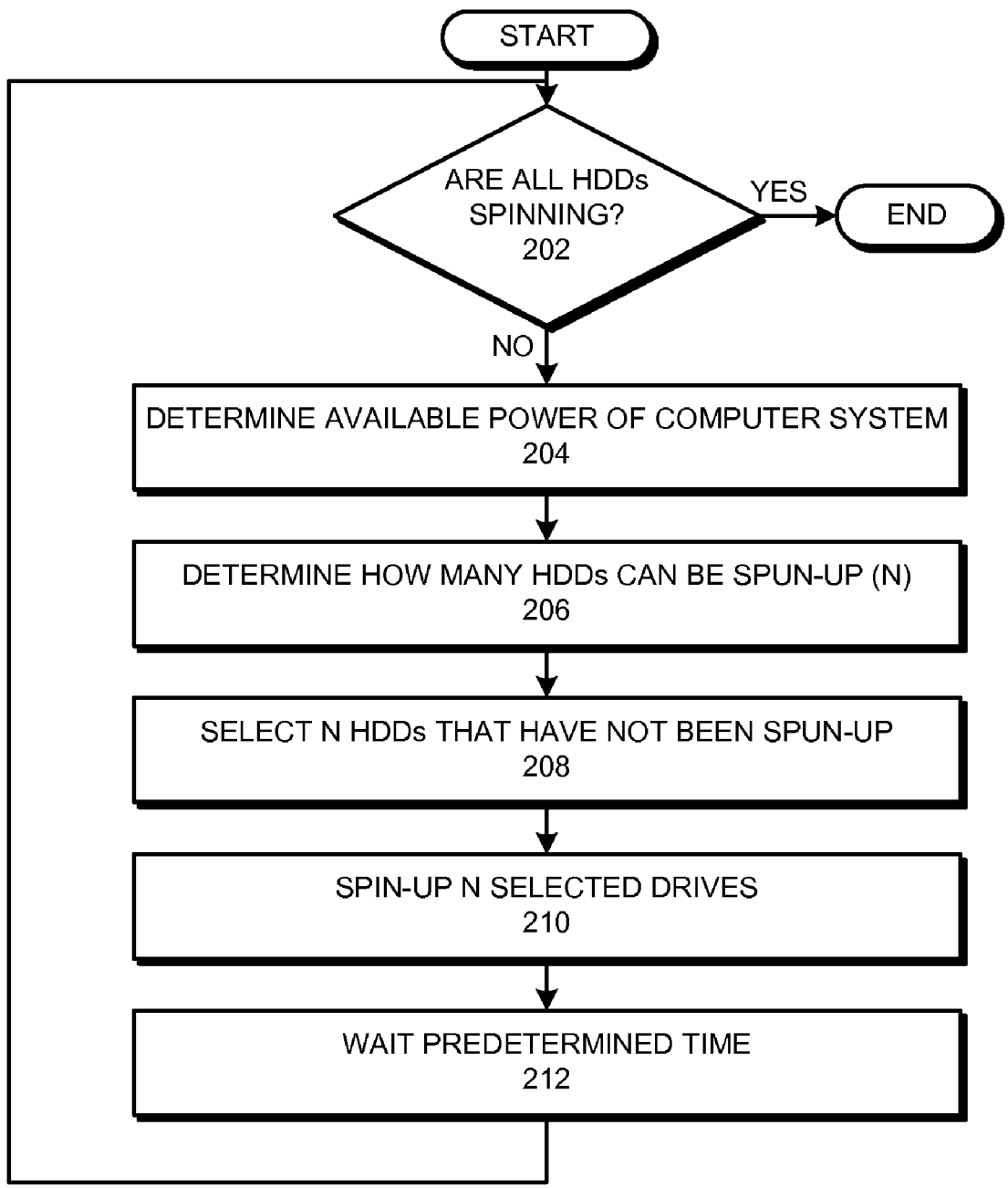
FIG. 2 presents a flowchart illustrating a process for scheduling spin-up operations for a set of hard disk drives in a computer system.

FIG. 2 presents a flowchart illustrating a process for scheduling spin-up operations for a set of hard disk drives in a computer system. First, if all HDDs are spinning (step 202) then the process ends. If all HDDs are not spinning (step 202), then the available power of the computer system is determined (step 204). In some embodiments, the available power is determined by subtracting the current power usage of the computer system from the maximum power available for the computer system. The current power usage of the computer system can be determined using any method now known or later developed that can determine the current power usage of a computer system including but not limited to directly measuring the current power usage, receiving a signal related to the current power usage, and those methods disclosed in U.S. Pat. No. 7,197,411; U.S. patent application entitled "Inferential Power Monitor Without Voltage/Current Transducers," application Ser. No. 11/205,924, filed 17 Aug. 2005; and U.S. patent application entitled "Estimating a Power Utilization of a Computer System," application Ser. No. 12/109,112, filed 24 Apr. 2008.

Then, using the available power determined in step 204, the number of HDDs in the set of HDDs that can be spun-up that have not yet spun-up is determined. (step 206). The number of HDDs that can be spun-up using the available power, N, is determined by subtracting the peak-power required to spin-up an HDD from the available power, for each HDD to be spun-up, until there is not enough available power remaining to spin-up another HDD. If each HDD requires the same amount of peak-power to spin-up, then the number of HDDs that can be spun-up is the integer quotient of the integer division of the available power by the peak-power required to spin-up an HDD.

Then, N HDDs are selected from the set of HDDs that have not yet been spun-up (step 208). The N selected HDDs are then spun-up (step 210). The process then waits a predetermined time (step 212) and then returns to step 202. The predetermined time can be any length of time including but not limited to 1 second, 5 seconds, 10 seconds, and 1 minute.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for scheduling spin-up operations for a set of hard disk drives (HDDs) in a computer system, the method comprising:
    estimating a power consumption of the computer system by inferring the power consumption from an inferential power model, wherein the inferential power model is trained during a training phase by monitoring power utilization and a set of performance parameters for the computer system while varying the load on a processor for the computer system from a minimum load to a maximum load;
    determining an available power of the computer system;
    selecting one or more HDDs from the set of HDDs to be spun-up based on the available power and the power required to spin-up each HDD; and
    scheduling spin-up operations for the selected HDDs.

2. The method of claim 1, wherein determining the available power includes:
    subtracting the estimated power consumption from a maximum power for the computer system.

3. The method of claim 2, further comprising determining the maximum power for the computer system based on at least one of: a power-supply constraint for the computer system, and a thermal constraint of the computer system.

4. The method of claim 1, wherein estimating the power consumption of the computer system includes estimating the power consumption by inferring the power consumption from instrumentation signals.

5. The method of claim 1, wherein determining the available power includes generating a dynamic trace of power consumption for the computer system based on dynamic traces of currents and associated voltages for individual components within the computer system.

6. The method of claim 1, wherein:
    scheduling spin-up operations for the selected HDDs includes spinning-up the HDDs.

7. The method of claim 1, wherein:
    determining the available power includes periodically determining the available power of the computer system;
    selecting the one or more HDDs to be spun-up includes periodically selecting the one or more HDDs to be spun-up; and
    scheduling the spin-up operations for the selected HDDs includes periodically scheduling the spin-up operations for the selected HDDs.

8. The method of claim 7, wherein:
    periodically scheduling the spin-up operations for the selected hard drives includes periodically scheduling the spin-up operations until all HDDs in the set of HDDs have been scheduled to be spun-up.

9. The method of claim 7, wherein:
    periodically determining the available power includes determining the available power at least once every 5 seconds.

10. The method of claim 1,
    wherein the inferential power model is generated using at least one of a nonlinear, nonparametric regression technique and a pattern-recognition technique; and
    wherein inferring the power consumption from the inferential power model comprises estimating the power consumption based on the set of performance parameters and the inferential power model.

11. The method of claim 1, wherein monitoring the power utilization and the set of performance parameters for the computer system while varying the load on a processor for the computer system from the minimum load to the maximum load comprises:
    while the processor is operating at a first frequency, measuring a power utilization of the computer system while cycling a load on the processor from a first minimum load to a first maximum load;
    while the processor is operating at a second frequency, measuring a power utilization of the computer system while cycling a load on the processor from a second minimum load to a second maximum load; and
    generating the inferential power model using at least one of a nonlinear, nonparametric regression technique or a pattern-recognition technique; and
    wherein inferring the power consumption from the inferential power model comprises using the set of performance parameters and the inferential power model.

12. An apparatus for scheduling spin-up operations for a set of hard disk drives (HDDs) in a computer system, the method comprising:
    an estimation mechanism configured to estimate a power consumption of the computer system by inferring the power consumption from an inferential power model, wherein the inferential power model is trained during a training phase by monitoring power utilization and a set of performance parameters for the computer system while varying the load on a processor for the computer system from a minimum load to a maximum load;
    a determining mechanism configured to periodically determine an available power of the computer system;
    a selecting mechanism configured to periodically select one or more HDDs from the set of HDDs to be spun-up based on the available power and the power required to spin-up each HDD; and
    a scheduling mechanism configured to periodically schedule spin-up operations for the selected HDDs, wherein periodically scheduling spin-up operations for the selected hard drives includes periodically scheduling spin-up operations until all HDDs in the set of HDDs have been scheduled to be spun-up.

13. A computer-readable storage medium storing instructions that when executed by a computer cause the computer to perform a method for scheduling spin-up operations for a set of hard disk drives (HDDs) in a computer system, the method comprising:

estimating a power consumption of the computer system by inferring the power consumption from an inferential power model, wherein the inferential power model is trained during a training phase by monitoring power utilization and a set of performance parameters for the computer system while varying the load on a processor for the computer system from a minimum load to a maximum load;

determining an available power of the computer system;

selecting one or more HDDs from the set of HDDs to be spun-up based on the available power and the power required to spin-up each HDD; and scheduling spin-up operations for the selected HDDs.

14. The computer-readable storage medium of claim 13, wherein determining the available power includes:
    subtracting the estimated power consumption from a maximum power for the computer system.

15. The computer-readable storage medium of claim 13, wherein estimating the power consumption of the computer system includes estimating the power consumption by inferring the power consumption from instrumentation signals.

16. The computer-readable storage medium of claim 13, wherein determining the available power includes generating a dynamic trace of power consumption for the computer system based on dynamic traces of currents and associated voltages for individual components within the computer system.

17. The computer-readable storage medium of claim 13, wherein:
    scheduling spin-up operations for the selected HDDs includes spinning-up the HDDs.

18. The computer-readable storage medium of claim 13, wherein:
    determining the available power includes periodically determining the available power of the computer system;
    selecting the one or more HDDs to be spun-up includes periodically selecting the one or more HDDs to be spun-up; and
    scheduling the spin-up operations for the selected HDDs includes periodically scheduling the spin-up operations for the selected HDDs.

19. The computer-readable storage medium of claim 18, wherein:
    periodically scheduling the spin-up operations for the selected hard drives includes periodically scheduling the spin-up operations until all HDDs in the set of HDDs have been scheduled to be spun-up.

20. The computer-readable storage medium of claim 18, wherein:
    periodically determining the available power includes determining the available power at least once every 5 seconds.

* * * * *